3,369,031
2,6-DI-SUBSTITUTED-4,4-BIS(PENTACHLORO-
PHENOXY)-2,5-CYCLOHEXADIENE-1-ONES
Hans-Dieter Becker, Schenectady, N.Y., assignor to
General Electric Company, a corporation of New
York
No Drawing. Filed Apr. 1, 1964, Ser. No. 356,628
4 Claims. (Cl. 260—396)

ABSTRACT OF THE DISCLOSURE

Novel di-pentachlorophenyl quinone ketals more specifically named 2,6-di-substituted-4,4-bis(pentachlorophenoxy)-2,5-cyclohexadiene-1-ones are prepared by reacting certain 2,6-di-substituted-4-halophenols with pentachlorophenol in the presence of active manganese dioxide. The quinone ketals so produced are useful as a stable source of free radicals or as polymerization inhibitors for polymerizable monomers.

This invention relates to a novel process for producing di-pentachlorophenyl quinone ketals and to the novel di-pentachlorophenyl quinone ketals produced thereby. More specifically, this invention relates to the preparation of quinone ketals by reacting hindered phenols which are 2,6-di-substituted 4-halophenols with pentachlorophenol in the presence of active manganese dioxide to produce the quinoine ketals, and to the novel quinone ketals which are 2,6 - di-substituted-4,4-bis(pentacholorphenoxy)-2,5-cyclohexadiene-1-ones.

The term "hindered phenols" or "cryptophenols" is used in the literature to designate those phenols having such large bulky groups in the two ortho positions that they prevent or hinder the phenolic hydroxyl group from participating in many of the reactions typical of phenols which do not contain such substituents. Typical of the substituents which may produce these so-called hindered or cryptophenols are those alkyl groups having a tertiary α-carbon atom, e.g., t-butyl, t-amyl, 1,1-diethylpropyl, 1-methyl-1-phenethyl, 1,1-dimethylbutyl, 1,1-dimethylpentyl, 1,1-dimethylhexyl, etc.; and aryl groups, e.g., phenyl, tolyl, xylyl, mesityl, duryl, ethylphenyl, chorophenyl, naphthyl, etc.

Hay, in J. Polymer Sci., 58, 581 (1962) discloses that these hindered phenols are oxidized to diphenoquinones whereas other phenols form polyphenylene ethers. In my copending application, Ser. No. 356, 653, filed concurrently herewith and assigned to the same assignee as the present invention, I have disclosed that if such hindered phenols also have a substituent in the para position which is a large bulky group or an alkoxy or aryloxy group, the hindered phenols are capable of being oxidized in solution in an inert solvent to a stable free radical, by use of active manganese dioxide. These stable free radicals can be reacted with a phenol to produce quinol ethers.

Martius and Eilingsfeld disclose in Liebig's Annalen, 607,159 (1957) the oxidation of solutions of various mono-alkyl ethers of dimethyl and tetramethyl hydroquinones with aqueous alkaline potassium ferricyanide solutions. They found that the products were dimers. The dimer from the mono-methyl ether of 2,6-dimethyl hydroquinone has the formula

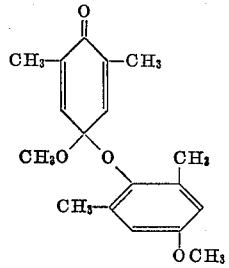

Such a compound is a mixed alkyl-aryl quinone ketal, although Martius and Eilingsfeld mistakenly refer to them as mixed quinone acetals. The only diaryl quinone ketal is described in Müller, Rieker and Beckert, in Z. Naturforschung, 17B, 567 (1962). This quinone ketal was prepared by oxidation of 4-pentachlorophenoxy-2,3,5,6-tetrachlorophenol with lead dioxide, to yield the quinone ketal, 4 - pentachlorophenoxy-4-(4-pentachlorophenoxy-tetrachlorophenoxy) tetrachloro-2,5-cyclohexadiene - 1-one:

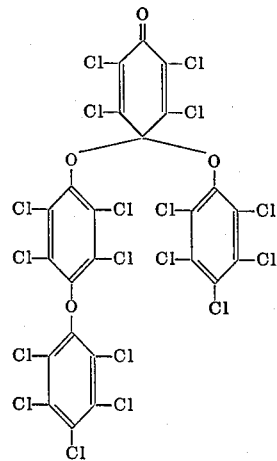

Both of these processes are expensive and time consuming since they require the preparation of the monoether of the substituted hydroquinone as the first step in the process.

I have now found that I may make quinone ketals very easily by reacting 2 mols of pentachlorophenol with 1 mol of a 2,6-di-substituted 4-halophenol where the substituents in the 2- and 6- positions are phenyl, chlorophenyl (mono-, di-, tri-, tetra- and pentachlorophenyl), $C_{1-8}$ alkyl-substituted phenyl, and $C_{4-8}$ alkyl groups having a tertiary α-carbon atom, and the halogen substituent is chlorine, bromine or iodine. The reaction is carried out in an inert solvent for the phenolic reactants in the presence of active manganese dioxide.

The active manganese dioxide is a well known material and is described for example by Attenburrow et al. in J. Chem. Soc., 1952, 1094; and Evans in Quart. Rev. (London), 13 161 (1959). It is a finely divided manganese dioxide formed by precipitation with aqueous alkali from an aqueous solution of a manganese salt and potassium permanganate. This form of manganese has greater oxidizing activity than commercially available manganese dioxide.

Typical of the substituents that may be in the 2- and 6- positions of the hindered phenol are for example, $C_{4-8}$ t-alkyl groups, e.g., t-butyl, t-amyl, 1,1-diethylproply, 1-methyl-1-ethylpropyl, 1,1-dimethylbutyl, 1,1-dimethylpentyl, 1,1-dimethylhexyl, etc.; an aryl group, e.g., phenyl, naphthyl, etc., $C_{1-8}$ alkyl-substituted phenyl, e.g., tolyl, ethylphenyl, propylphenyl, butylphenyl, octylphenyl, xylyl, diethylphenyl, mesityl, duryl, etc.; chlorophenyl, e.g., mono-, di-, tri-, tetra- and pentachlorophenyl, chloronaphthyl, etc. Typical examples of hindered phenols which I may use are 2,6-di-t-butyl-4-chlorophenol, 2,6-di-t-butyl-4-bromophenol, 2,6-di-t-butyl-4-iodophenol, 2,6-di-t-amyl-4-bromophenol, 4-bromo-2,6-di(1,1-dimethylbutyl)-phenol, 2-t-amyl-4-bromo-6-t-butylphenol, 4-bromo-2,6 - di-(1,1 - dimethylhexyl)phenol, 4-bromo-2-t-butyl-6-phenylphenol, 4-chloro-2,6 - diphenylphenol, 4-bromo - 2,6 - ditolylphenol, 4-iodo-2,6-dixylylphenol, 4-bromo - 2,6 - di(1,1-dimethylpropyl)phenol, 4-bromo - 2,4 - tri(2,4,6-trichlorophenyl)phenol, etc. Such phenols will hereinafter, for the sake of brevity, be referred to as hindered, disubstituted halophenols.

When any of the above hindered disubstituted halophenols are dissolved in an inert solvent, for example, a liquid organic solvent such as benzene, toluene, xylene, heptane, octane, petroleum ether, chloroform, carbon tetrachloride, ethers, e.g., diethyl ether, ketones, e.g., acetone, etc., along with pentachlorophenol, in the ratio of 1 mol of the former phenol to 2 mols of the latter phenol, and activated manganese dioxide is added, the two phenols readily react at ambient temperature in a period as short as 30 minutes, even though the manganese dioxide does not dissolve in the reaction mixture, to form the 4,4-bis(pentachlorophenoxy) - 2,5-cyclohexadiene-1-one in which the substituents in the 2- and 6- positions are the same as the substituent on the starting hindered 2,6-disubstituted halophenol. Preferably, an inert gas atmosphere is maintained over the solution to prevent oxygen from the air from reacting with the phenols. Since the reaction proceeds so rapidly at room temperature, there is no need to carry out the reaction at higher or lower temperatures, although it can be done if desired.

The active manganese dioxide should be used in sufficient quantity that it is capable of oxidizing all of the phenol reactants to the desired quinone ketal. Since the manganese dioxide does not dissolve in the reaction mixture and can be readily removed from the reaction mixture at the end of the reaction, and since an excess of manganese dioxide does not cause any trouble and insures high yields, I usually use 15 to 30 mols of manganese dioxide for each mol of hindered disubstituted halophenol initially present. After the reaction, the manganese dioxide is readily filtered from the reaction mixture and may be re-used as long as it is capable of oxidizing the reactants. The quinone ketal is isolated by evaporation of the solvent from the filtrate. Highest yields and highest purity of product of the quinone ketal are obtained if the evaporation is carried out at relatively low temperatures, for example, at room temperature under vacuum. For this reason, I prefer to use inert solvents that can be readily evaporated at ambient temperature under vacuum. Since the actual solvent used does not affect the reaction, as long as it will dissolve the phenol reactants but will not enter into the reaction, the actual solvent used is not critical, and its choice is based on convenience, cost, and availability. Aromatic hydrocarbons, e.g., benzene, toluene, xylene, ethylbenzene, etc., make excellent solvents to use. Of these, benzene is preferred, since it is easiest to evaporate at ambient temperature under vacuum, but any inert solvent may be used.

The following examples are given by way of illustration and not by way of limitation. All parts and percentages are by weight, unless otherwise stated.

*Example 1*

The active manganese dioxide is prepared by dissolving 1110 grams of manganese sulfate tetrahydrate in 1500 ml. of water and this solution is added simultaneously with 1170 ml. of 40% aqueous solution of sodium hydroxide, during a one-hour period to a hot, stirred solution of 960 grams of potassium permanganate in 6 liters of water. The manganese dioxide forms as a fine brown precipitate. The mixture is stirred one hour and then centrifuged. The precipitated manganese dioxide is washed until the washings are colorless. The manganese dioxide is dried at 100–120° C. and ground to a fine powder.

*Example 2*

To a solution of 2.66 g. of pentachlorophenol and 1.43 g. of 4-bromo-2,6-di-t-butylphenol dissolved in 300 ml. of benzene was added 26 g. of the active manganese dioxide of Example 1. The suspension was shaken under nitrogen for 30 minutes, after which the manganese dioxide was removed by filtration and washed with 200 ml. of benzene. The filtrate and washings were evaporated under vacuum at room temperature to produce the quinone ketal, 2,6-di-t-butyl-4,4-bis(pentachlorophenoxy)-2,5-cyclohexadiene-1-one, as a light yellow crystalline product, which weighed 3.05 grams (83% of theory). Its melting point was 155° C. After recrystallization by dissolving in cold chloroform, and addition of absolute ethanol, the quinone ketal was obtained as colorless needles having a melting point of 166–167° C. (decomposition). Osmotic determination of molecular weight in a chloroform solution gave a value of 698, which agrees within experimental error with the theoretical value of 734.80. Elemental analysis showed that the product contained 42.24% carbon, 2.82% hydrogen, and 48.38% chlorine, which agrees very well with the theoretical values of 42.49% carbon, 2.72% hydrogen, and 48.25% chlorine. The same product is obtained by using an equivalent amount of either 4-chloro-2,6-di-t-butylphenol or 4-iodo-2,6-di-t-butylphenol in place of the 4-bromo-2,6-di-t-butylphenol.

*Example 3*

The quinone ketal, 4,4-bis(pentachlorophenoxy)-2,6-diphenyl-2,5-cyclohexadiene-1-one is prepared in the same way as described in Example 2, except using an equivalent amount (1.64 g.) of 4-bromo-2,6-diphenylphenol in place of the 4-bromo-2,6-di-t-butylphenol.

*Example 4*

The quinone ketal, 2 - t - amyl - 6 - tolyl - 2,5 - cyclohexadiene-1-one is prepared in the same way as described in Example 2, but using an equivalent amount (1.67 g.) of 2-t-amyl-4-bromo-6-tolylphenol in place of the 4-bromo-2,6-di-t-butylphenol.

The quinone ketals of this invention have a wide variety of uses, as intermediates in preparing other compounds, or as a stable source of readily produced free radicals. For example, these quinone ketals when heated above their melting point or to temperatures about 50° C. in solution, dissociate into free radicals and therefore serve as a convenient source of free radicals which develop upon the application of heat. The quinone ketals are stabilizers for monomeric ethylenic unsaturated compounds and stabilize such compositions against polymerizing even when heated. For example, when the quinone ketals of this invention are dissolved in monomeric styrene, the styrene may be heated for many hours at 60° C. without the styrene polymerizing, whereas styrene not containing the quinone ketals readily becomes viscous and then solid under such conditions. Other uses for the quinone ketals will be readily recognized by those skilled in the art.

Obviously, other modifications and variations of the present invention are possible in light of the above teachings. Therefore, it is to be understood that changes may be made in the particular embodiments of the invention described which are within the full intended scope of the invention as defined by the appended claims.

What I claim as new and desire to secure by Letters Patent of the United States is:

1. The process of making quinone ketals which comprises reacting in solution (a) pentachlorophenol with (b) a 2,6-disubstituted 4-halophenol wherein the substituents in the 2- and 6- positions are selected from the group consisting of phenyl, chlorophenyl, $C_{1-8}$ alkyl-substituted phenyl and $C_{4-8}$ alkyl groups having a tertiary α-carbon atom and the halogen substituent is selected from the group consisting of chlorine, bromine and iodine, in the ratio of 2 mols of (a) per mol of (b) in the presence of (c) active manganese dioxide and thereafter separating the quinone ketal from the reaction mixture.

2. The process of making 2,6 di-t-butyl-4,4-bis(pentachlophenoxy)-2,5-cyclohexadiene-1-one which comprises reacting a solution of (a) pentachlorophenol with (b) 4-bromo-2,6-di-t-butylphenol in the ratio of 2 mols of (a) per mol of (b) in the presence of (c) active manganese dioxide and thereafter separating the 2,6-di-t-butyl-4,4 - bis(pentachlorophenoxy) - 2,5 - cyclohexadiene - 1-one from the reaction mixture.

3. A 2,6 - disubstituted - 4,4 - bis(pentachlorophenoxy)-2,5-cyclohexadiene-1-one wherein the substituents in the 2- and 6- positions are selected from the group consisting of phenyl, chlorophenyl, $C_{1-8}$ alkyl-substituted phenyl and $C_{4-8}$ alkyl groups having a tertiary α-carbon atom.

4. 2,6 - di - t - butyl - 4,4 - bis(pentachlorophenyoxy)-2,5-cyclohexadiene-1-one.

References Cited

UNITED STATES PATENTS 3,220,979  11/1965  McNelis _____ 252—471

OTHER REFERENCES

Chemical Abstract, Muller et al., vol. 53 (1959), pp. 2142d to 2143b relied on.

LORRAINE A. WEINBERGER, *Primary Examiner.*
RICHARD K. JACKSON, *Examiner.*
L. A. THAXTON, *Assistant Examiner.*